March 23, 1926.　　　　　　　　　　　　　　　　1,577,817
L. J. SPENCE
FREIGHT CAR CONSTRUCTION
Filed July 2, 1924　　　3 Sheets-Sheet 1
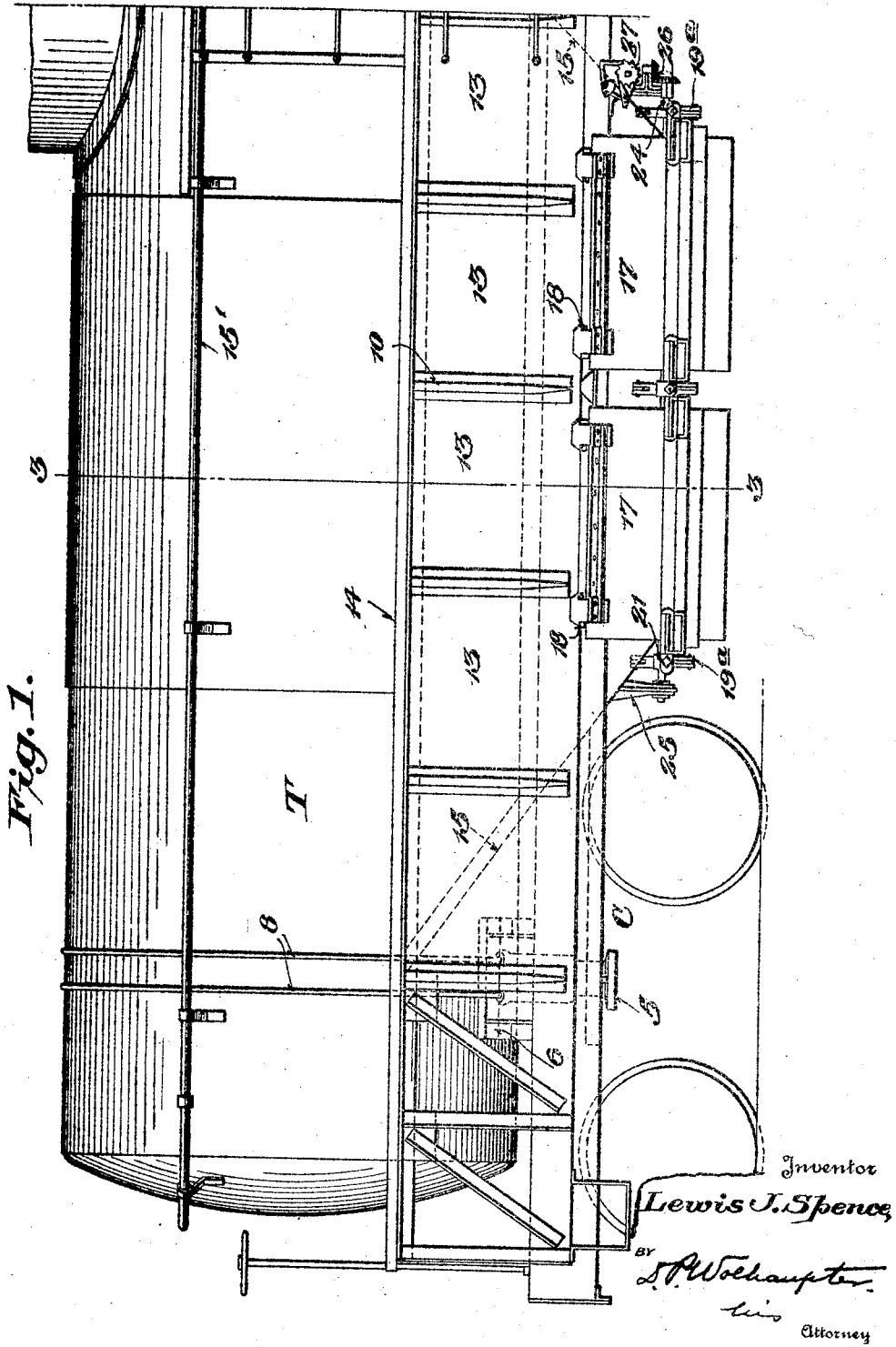

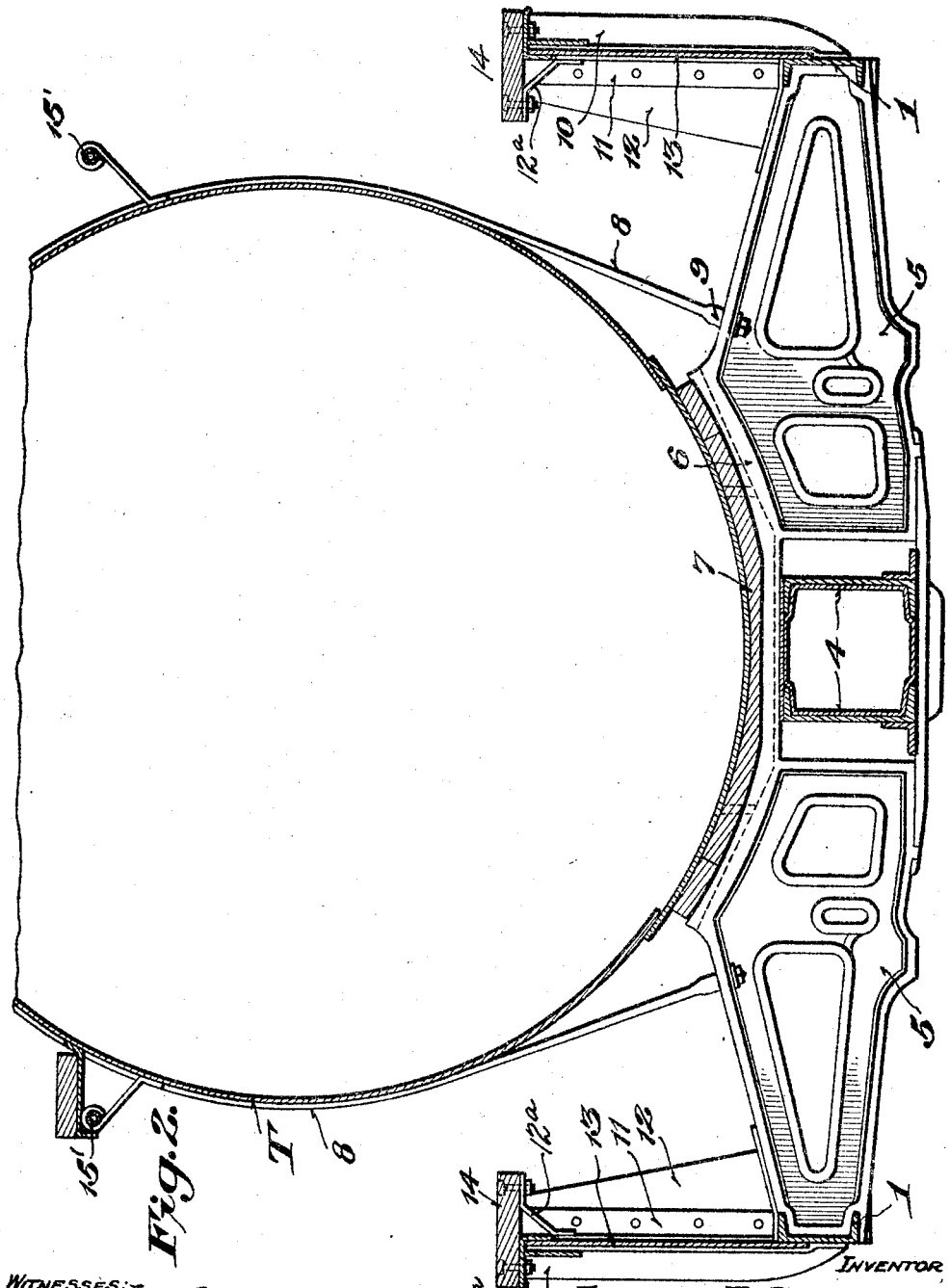

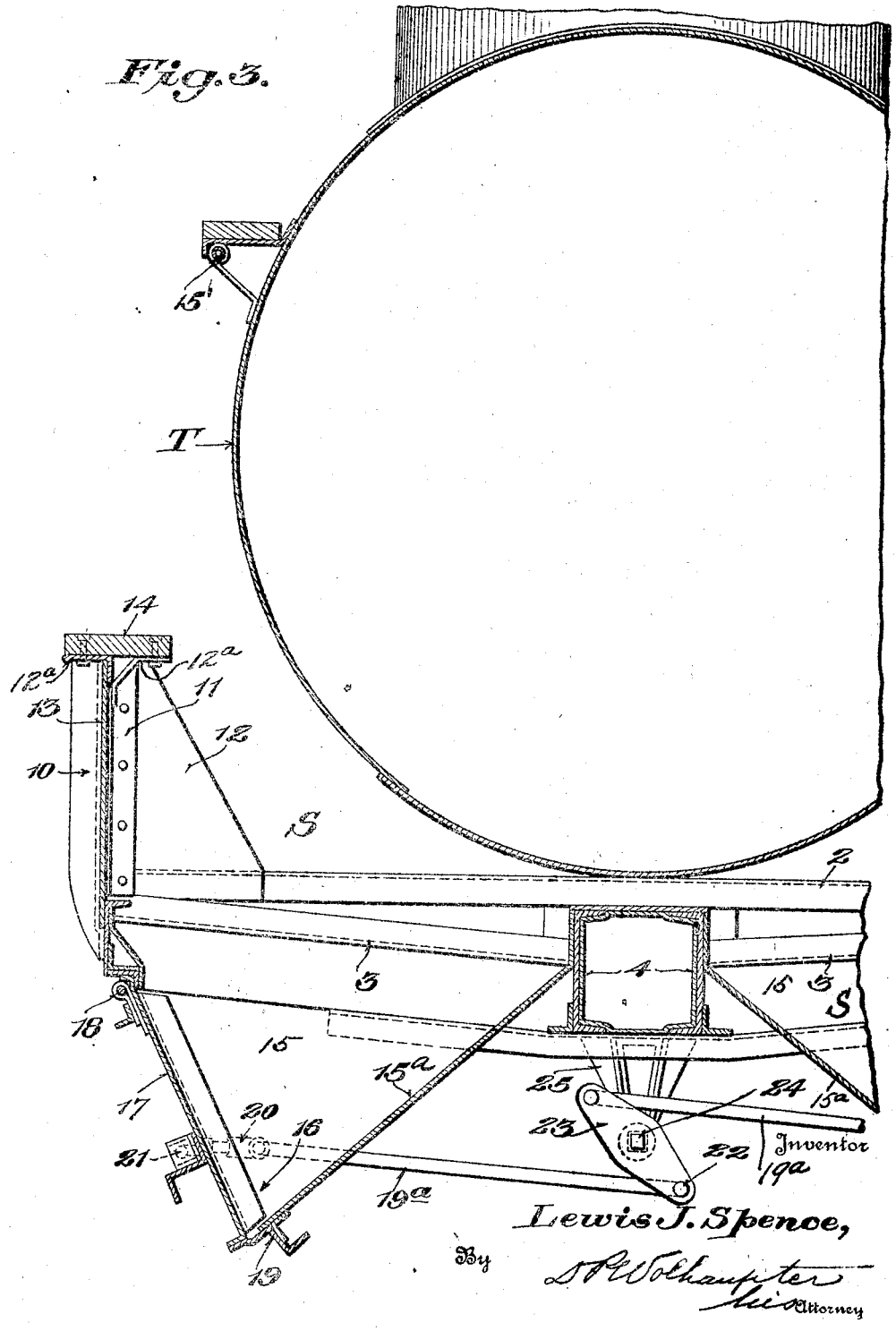

Patented Mar. 23, 1926.

1,577,817

UNITED STATES PATENT OFFICE.

LEWIS J. SPENCE, OF BROOKLYN, NEW YORK.

FREIGHT-CAR CONSTRUCTION.

Application filed July 2, 1924. Serial No. 723,781.

*To all whom it may concern:*

Be it known that I, LEWIS J. SPENCE, citizen of the United States, residing at New York, borough of Brooklyn, in the county of Kings and State of New York, have invented certain new and useful Improvements in Freight-Car Constructions, of which the following is a specification.

This invention relates to freight car construction, more particularly of the tank car type, and has for its object a novel utilization of the space at and beyond the sides of the tank for transporting other commodities than oil, such as ore, slag, broken stone, sand, coal or similar bulk material.

To this end the invention contemplates certain structural improvements in the chassis or body frame part of a tank car to provide supplemental cargo compartments, whereby the tank car after discharge of its cargo of oil may be advantageously utilized on its return trip for carrying a cargo of another commodity, thereby increasing the revenue producing capacity of the car.

From a more specific aspect, the present invention contemplates a novel design of chassis construction for tank cars providing a supplemental cargo compartment in the form of a hopper bottom construction with drop door arrangement, thus making a combined tank and hopper bottom car. This represents another phase of the invention disclosed and claimed in my companion application Serial No. 723,780 filed of even date herewith.

With these and other objects in view which will be readily apparent to those familiar with the handling of freight on railroads the invention consists in the novel construction, combination and arrangement of parts hereinafter more fully described, illustrated and claimed.

Though susceptible of modification as to its details of construction a preferred and practical embodiment of the invention is shown in the accompanying drawings, in which:

Figure 1 is a side elevation of a tank car construction embodying the improved features of the present invention.

Figure 2 is a vertical cross-sectional view of the car structure at the location of the bolster frame which provides the main saddle or support for the tank, and Figure 3 is a vertical transverse sectional view on the line 3—3 of Fig. 1 showing in detail the preferable construction of the supplemental cargo hopper. Similar reference characters designate corresponding parts throughout the several figures of the drawings.

In carrying forward the present invention the chassis or body frame of the car, designated generally by the reference letter C, includes the flanged structural side beams or sills 1, transversely arranged upper and lower cross beams 2 and 3, at the required locations and a medial supporting girder 4 preferably of the box girder type, and which is arranged centrally and longitudinally of the structure to provide the main longitudinal support or base beneath the tank T which is supported and fastened on the chassis or body frame. In addition to these specified structural elements of the chassis or body frame which are riveted or otherwise suitably united according to the usual car building practice, there is preferably arranged at each end portion of the structure the bolster frame 5 joined at its ends to the side beams 1 and provided at its central portion at the top with an arched saddle 6 on which is fitted the wooden or equivalent bearing shoe 7 providing a seat for the bottom portion of the tank; and the tank band or bands 8 which encircle the tank are bolted or otherwise suitably fastened at their ends 9 to the opposite end portions of the transverse bolster frame 5.

The opposite side projecting portions of the chassis or body frame have joined thereto upstanding side walls 10 preferably consisting of upright structural bars 11 fastened to the side beams 1 and rigidly braced by means of the bracing gussets or plates 12 fastened thereto and also to cross members of the chassis or body frame. The said upright bars 11 of each side wall 10 have fitted to their top edge portions the flanged or equivalent plates 12$^a$ having horizontal portions to which is fastened a running board 14 for the men of the train crew and above the running board on the side of the tank T is arranged the usual hand rail 15' for the men.

Throughout the medial portions of the projecting sides of the chassis or body frame the upright side walls 10 thereof are enclosed by the side plates 13 which constitute the outer side walls of supplemental cargo compartments designated generally by the letter S in Figure 3 of the drawings. Each supplemental cargo compartment S is preferably of the hopper type and not only includes the outer enclosing wall or wall plates 13 but also the oppositely disposed and downwardly inclined end bottom walls 15 and a downwardly and outwardly inclined main bottom wall 15ª. The downwardly and outwardly inclined main bottom wall 15 of each supplemental compartment S is arranged so that its lower outer edge is disposed at a distance below the outer side edge of the chassis to provide a discharge opening 16 which is covered and uncovered by a hinged drop door 17. This drop door 17 is hinged at its upper edge as at 18 at the upper edge of the door opening 16 and the lower edge portion of the said drop door carries a flanged keeper plate 19 adapted to embrace the lower edge of the main bottom plate 15 to provide a complete closure of the door opening 16 when the drop door 17 is in its closed position. It is held in that position by means of controlling rods 19ª provided at their outer ends with pivotal link connections 20 having pivotal connection with the door 17 as at 21 and the inner end of each of the controlling rods 19 is pivotally connected as at 22 to one end of a rocker plate 23 mounted on an operating shaft 24 journalled in suitable bearing hangers 25 supported at the underside of the chassis or body frame, and actuated from gears 26 which in turn are operated by a hand crank and ratchet device 27, similar to devices of that kind employed in connection with the drop doors of an ordinary hopper bottom type freight car. These devices when operated provide for mechanically and forcibly opening the drop doors 17 when it is desired to discharge the load contained in the hoppers, and also to close the doors and hold them tightly closed with the hopper compartments either empty or filled.

It will be seen from the foregoing that practically all of the valuable spaces contiguous to, beyond and below the sides of the tank T are utilized to form suplemental hopper bottom cargo compartments providing very substantial cargo spaces to permit the carrying of commodities other than oil, and from the foregoing description, especially taken in connection with the description of the companion case Serial No. 723,780 it is believed that the essentials of the invention will now be understood without further description.

Changes in the form, proportion and minor details of construction may be resorted to without departing from the spirit or sacrificing any of the advantages of the invention.

I claim:—

1. A freight car construction including a chassis having supporting means for a tank and supplemental cargo compartments having drop doors beneath the tank and top openings along the sides of the tank.

2. A freight car construction including a chassis having supporting means for the tank, and supplemental hopper-bottom cargo compartments provided with drop doors below the tank and top openings along the sides of the tank.

3. A freight car construction including a chassis having supporting means for a tank, and provided at each projecting side portion with structural members arranged to form a hopper-bottom cargo compartment, the hopper bottom being below the tank and the compartment having a top opening along side of the tank.

4. A freight car construction including a chassis having supporting means for a tank and provided on each projecting side portion with structural members arranged to form a cargo hopper having a discharge opening below the tank and a top opening along side of the tank, and a drop door for covering and uncovering said discharge opening.

5. A freight car construction including a chassis having supporting means for a tank and provided at each projecting side portion with a cargo hopper having an upstanding closed side wall spaced from the side of the tank to provide a top opening for the cargo and a door covered bottom portion.

6. A freight car construction including a chassis having supporting means for a tank and provided at each projecting side portion with a supplemental cargo hopper having an upstanding closed side wall spaced from the side of the tank to provide a top opening for the hopper, inclining bottom portions, and a drop door at the discharge opening.

7. A freight car construction including a chassis having supporting means for a tank and provided on each projecting side portion with an upstanding closed side wall spaced from the side of the tank to provide a top opening for the hopper, inclining bottom portions arranged to form a lateral discharge opening below the side wall, and a mechanically operated drop door for covering and uncovering said discharge opening.

8. A freight car construction including a chassis having supporting means for a tank and provided on each projecting side portion with a supplemental cargo hopper, said hopper having an upstanding closed side wall spaced from the adjacent side of the tank to provide a top opening for the hopper, inclining bottom members arranged to provide a lateral discharge opening and a mechanically operated hinged drop door arranged to cover and uncover said discharge opening.

9. A freight car construction including a chassis having supporting means for a tank and provided at each projecting side portion with supplemental cargo hoppers, each of said cargo hoppers being provided with an upstanding closed side wall spaced from the side of the tank to provide a top opening for the hopper, and a running board surmounting the said side wall.

10. A tank car provided upon opposite sides of its tank with supplemental hopper-bottom cargo compartments provided with drop doors operating below the tank and said compartments having top filling openings along the sides of the tank.

In testimony whereof I hereunto affix my signature.

LEWIS J. SPENCE.